US012719647B2

(12) United States Patent
Takeda et al.

(10) Patent No.: US 12,719,647 B2
(45) Date of Patent: Aug. 25, 2026

(54) PDSCH RATE MATCHING FOR CORESET

(71) Applicant: QUALCOMM Incorporated, San Diego, CA (US)

(72) Inventors: Kazuki Takeda, Minato-ku (JP); Peter Gaal, San Diego, CA (US); Hobin Kim, San Diego, CA (US); Andrew Chen, San Diego, CA (US); Chun-Hao Hsu, San Jose, CA (US); Huilin Xu, Temecula, CA (US); Harinath Reddy Patel, Hyderabad (IN); Pankaj Shivcharan Gupta, Hyderabad (IN); Ashutosh Gupta, Gangapur City (IN); Neeraj Panwar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 18/282,179

(22) PCT Filed: May 17, 2022

(86) PCT No.: PCT/US2022/029695
§ 371 (c)(1),
(2) Date: Sep. 14, 2023

(87) PCT Pub. No.: WO2022/245870
PCT Pub. Date: Nov. 24, 2022

(65) Prior Publication Data

US 2024/0163062 A1 May 16, 2024

(30) Foreign Application Priority Data

May 19, 2021 (IN) ............................ 202141022408

(51) Int. Cl.
*H04L 5/00* (2006.01)

(52) U.S. Cl.
CPC .......... *H04L 5/0064* (2013.01); *H04L 5/0053* (2013.01); *H04L 5/0092* (2013.01)

(58) Field of Classification Search
CPC ... H04L 5/0064; H04L 5/0063; H04L 5/0092; H04L 5/0094; H04L 5/0044
See application file for complete search history.

(56) References Cited

U.S. PATENT DOCUMENTS 12,323,846 B2 * 6/2025 Wang .................... H04L 5/0053
2020/0067676 A1 * 2/2020 Yi ......................... H04W 72/23
(Continued)

OTHER PUBLICATIONS

3GPP TSG RAN WG1 Meeting#92bis, R1-1805251 Title:Modificatiin for UE procedure fo rreceiving control information (Year: 2018).*
(Continued)

*Primary Examiner* — Faruk Hamza
*Assistant Examiner* — Abusayeed M Haque
(74) *Attorney, Agent, or Firm* — Procopio, Cory, Hargreaves & Savitch LLP

(57) ABSTRACT

Methods, apparatuses, and computer-readable medium are provided for rate matching. An example method may include receiving a rate matching pattern configuration indicating at least a first control resource set (CORESET) in a first bandwidth part (BWP) and a second CORESET in a second BWP. The example method may also include receiving a physical downlink shared channel (PDSCH) in the first BWP. The example method may include processing the PDSCH transmission based on the rate matching pattern configuration, where the processing may include rate matching around resources of the first CORESET and first associated search space (SS) sets and the second CORESET and second associated SS sets.

10 Claims, 12 Drawing Sheets

(56) References Cited

U.S. PATENT DOCUMENTS

| | | | |
|---|---|---|---|
| 2021/0029513 A1 | 1/2021 | Rico Alvarino et al. | |
| 2021/0385826 A1* | 12/2021 | Moon | H04W 72/23 |
| 2022/0312334 A1* | 9/2022 | Gao | H04L 1/0003 |
| 2024/0098506 A1* | 3/2024 | Kurita | H04W 74/00 |

OTHER PUBLICATIONS

3GPP TSG RAN WG1 Meeting#97, R1-1906643 Title:NR-U uplink signals and channels (Year: 2019).*

Huawei., et al., "Discussion on the Conditions of Rate Matching Pattern Overlapping with PDSCH DMRS Symbols", 3GPP TSG RAN WG1 Meeting #101-e, R1-2004604, 3rd Generation Partnership Project, Mobile Competence Centre, 650, Route Des Lucioles, F-06921 Sophia-Antipolis Cedex, France, vol. RAN WG1, No. E-meeting, May 25, 2020-Jun. 5, 2020, May 16, 2020, XP051886320, 9 Pages.

International Search Report and Written Opinion—PCT/US2022/029695—ISA/EPO—Jul. 29, 2022.

* cited by examiner

One Frame (TDD)
10 ms
subframe
slot
RB
200 subcarrier
OFDM symbol
DMRS R
CSI-RS
230
PDCCH CORESET
SSS
PSS
PDSCH
PBCH
REG 12 REs
1 CCE = 6 REGs
SS/PBCH Block
BWP
20 RBs
channel bandwidth RBs

250

SRS Comb 0
SRS Comb 1
SRS
280
PUCCH
PUSCH

PDSCH RATE MATCHING FOR CORESET

CROSS REFERENCE TO RELATED APPLICATION(S)

This application is a National Stage Application filed under 35 U.S.C. § 371 of PCT International Application No. PCT/US2022/029695, entitled "PDSCH RATE MATCHING FOR CORESET" and filed May 17, 2022, which claims the benefit of and priority to Indian Patent Application number 202141022408, entitled "PDSCH RATE MATCHING FOR CORESET" and filed on May 19, 2021, which are expressly incorporated by reference herein in their entirety.

TECHNICAL FIELD

The present disclosure relates generally to communication systems, and more particularly, to wireless communication systems with rate matching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a network entity (e.g., a user equipment (UE)) are provided. The apparatus may include a memory and at least one processor coupled to the memory. The memory and the at least one processor coupled to the memory may be configured to receive a rate matching pattern configuration indicating at least a first control resource set (CORESET) in a first bandwidth part (BWP) and a second CORESET in a second BWP. The memory and the at least one processor coupled to the memory may be further configured to receive a physical downlink shared channel (PDSCH) transmission in the first BWP as an active BWP and process the PDSCH transmission based on the rate matching pattern configuration, where to process the PDSCH transmission based on the rate matching pattern configuration, the at least one processor is configured to rate match around resources of the first CORESET and first associated search space (SS) sets and the second CORESET and second associated SS sets and rate match around resources of the first CORESET and first associated search space (SS) sets and the second CORESET and second associated SS sets.

In another aspect of the disclosure, a method, a computer-readable medium, and an apparatus at a network entity (e.g., a UE) are provided. The apparatus may include a memory and at least one processor coupled to the memory. The memory and the at least one processor coupled to the memory may be configured to receive a rate matching pattern configuration indicating at least a first CORESET in a first BWP and a second CORESET in a second BWP. The memory and the at least one processor coupled to the memory may be further configured to process the PDSCH transmission based on the rate matching pattern configuration, and where to process the PDSCH transmission, the at least one processor is configured to rate match around resources of the first CORESET and first associated search space (SS) sets and not around the second CORESET, where the rate matching is based on the first CORESET being configured for the active BWP and being different than CORESET-0.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, for a UE, a rate matching pattern configuration indicating at least a first CORESET in a first BWP and a second CORESET in a second BWP. The memory and the at least one processor coupled to the memory may be further configured to rate match data, for a PDSCH transmission in the first BWP as an active BWP for the UE, around resources of the first CORESET and first associated SS sets and the second CORESET and second associated SS sets. The memory and the at least one processor coupled to the memory may be further configured to transmit the PDSCH transmission for the UE.

In another aspect of the disclosure, a method, a computer-readable medium, and an apparatus at a network entity (e.g., a base station) are provided. The apparatus may include a memory and at least one processor coupled to the memory. The memory and the at least one processor coupled to the memory may be configured to transmit, for a UE, a rate matching pattern configuration indicating at least a first CORESET in a first BWP and a second CORESET in a second BWP. The memory and the at least one processor coupled to the memory may be further configured to rate match data, for a PDSCH transmission in the first BWP as an active BWP for the UE, around resources of the first CORESET and first associated SS sets and not around the second CORESET based on the first CORESET being configured for the active BWP and being different than CORESET-0. The memory and the at least one processor coupled to the memory may be further configured to transmit the PDSCH transmission for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
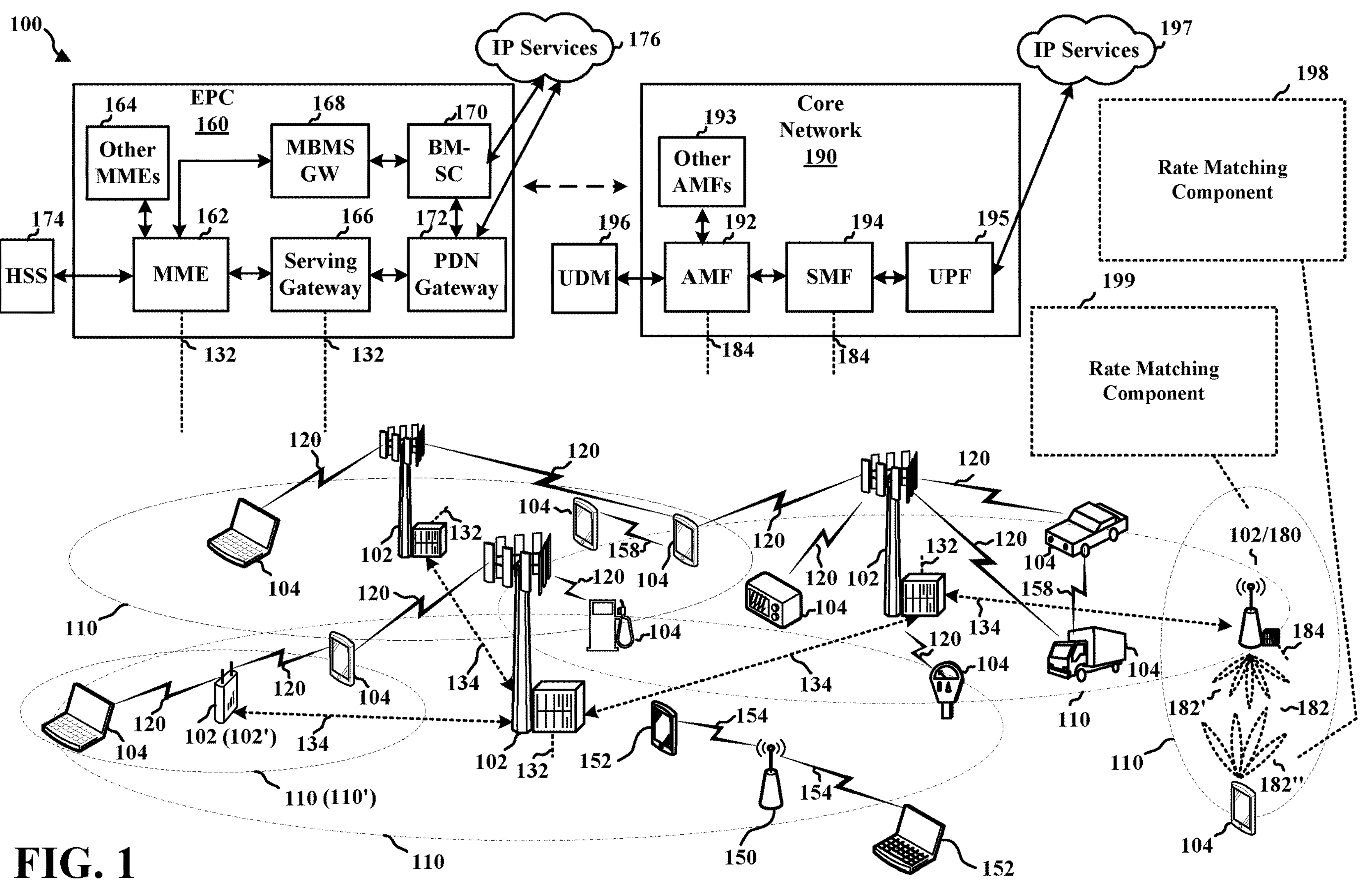
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some wireless communication systems, rate matching may be used by a network entity to rate match one or more incoming bits to available time, subcarrier (frequency), or other available resources. The incoming bits may be encoded and may be transmitted over the available resources based on the rate matching. For example, via rate matching, a network entity may extract a set of bits with a defined number to be transmitted within a transmission time interval (TTI). By way of example, to perform rate matching, a network entity may perform sub-block interleaving, bit collection, and bit selecting.

Physical downlink shared channel (PDSCH) rate matching may support CORESET-level rate matching in some wireless communication systems to rate match PDSCH bits around resources for one or more CORESETs. Example aspects provided herein provide for improved rate matching relating to CORESETs, including the provision of a reference numerology for CORESET-level rate matching and rate matching that includes a partial overlap between a CORSET and a BWP.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a rate matching component 198. In some aspects, the rate matching component 198 may be configured to receive a rate matching pattern configuration indicating at least a first CORESET in a first BWP and a second CORESET in a second BWP. In some aspects, the rate matching component 198 may be further configured to receive a PDSCH in the first BWP as an active BWP based on rate matching around resources of the first CORESET and first associated SS sets and the second CORESET and second associated SS sets. In some aspects, the rate matching component 198 may be further configured to receive a rate matching pattern configuration indicating at least a first CORESET in a first BWP and a second CORESET in a second BWP. In some aspects, the rate matching component 198 may be further configured to receive a PDSCH in the first BWP as an active BWP based on rate matching around resources of the first CORESET and first associated SS sets and not around the second CORESET, wherein the rate matching is based on the first CORESET being configured for the active BWP and being different than CORESET-0.

In some scenarios, the term UE may also apply to one or more companion devices such as in a device constellation arrangement. One or more of these devices may collectively access the network and/or individually access the network. A network node or network entity can be implemented as a base station (i.e., an aggregated base station), as a disaggregated base station, an integrated access and backhaul (IAB) node, a relay node, a sidelink node, etc. A network node or network entity can be implemented as a base station (i.e., an aggregated base station), or alternatively, as a central unit (CU), a distributed unit (DU), a radio unit (RU), a Near-Real Time (Near-RT) RAN Intelligent Controller (MC), or a Non-Real Time (Non-RT) MC in a disaggregated base station architecture. In some aspects, a network node may be referred to as a network entity, or vice versa.

In some aspects, the base station 180 may include a rate matching component 199. In some aspects, the rate matching component 199 may be configured to transmit, to a UE, a rate matching pattern configuration indicating at least a first CORESET in a first BWP and a second CORESET in a second BWP. In some aspects, the rate matching component 199 may be further configured to rate match data, for transmission in a PDSCH in the first BWP as an active BWP for the UE, around resources of the first CORESET and first associated SS sets and the second CORESET and second associated SS sets. In some aspects, the rate matching component 199 may be further configured to transmit, to a UE, a rate matching pattern configuration indicating at least a first CORESET in a first BWP and a second CORESET in a second BWP. In some aspects, the rate matching component 199 may be further configured to rate match data, for transmission in a PDSCH in the first BWP as an active BWP for the UE, around resources of the first CORESET and first associated SS sets and not around the second CORESET based on the first CORESET being configured for the active BWP and being different than CORESET-0. In some aspects, the rate matching component 199 may be further configured to transmit the PDSCH to the UE.

Although the following description may be focused on 5G NR, the concepts described herein may be applicable to other similar areas, such as LTE, LTE-A, CDMA, GSM, and other wireless technologies.

Figures 2A, 2B, 2C, 2D:
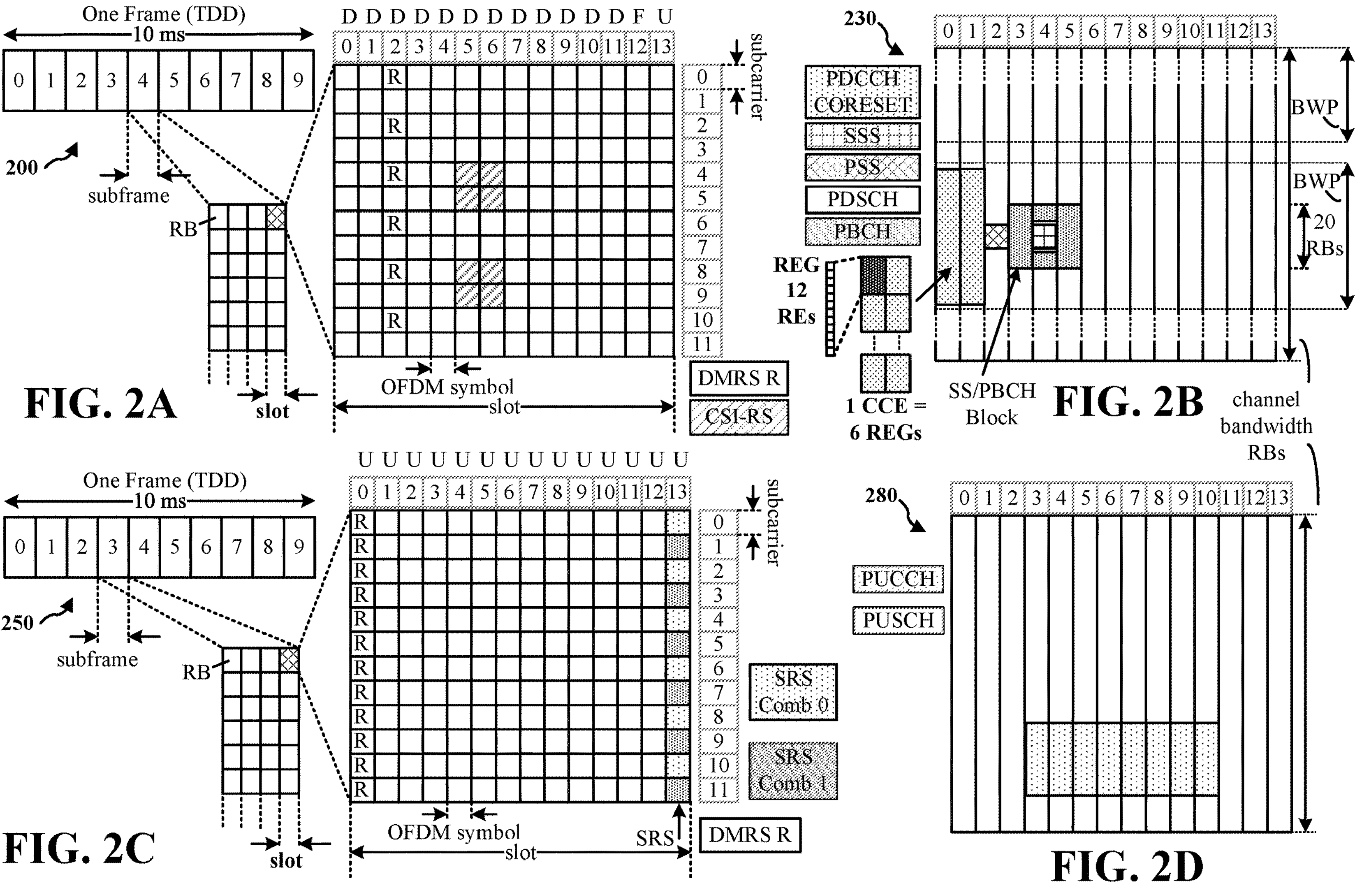
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |

-continued

| $\mu$ | SCS $\Delta f = 2^{\mu} \cdot 15$ [kHz] | Cyclic prefix |
|---|---|---|
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
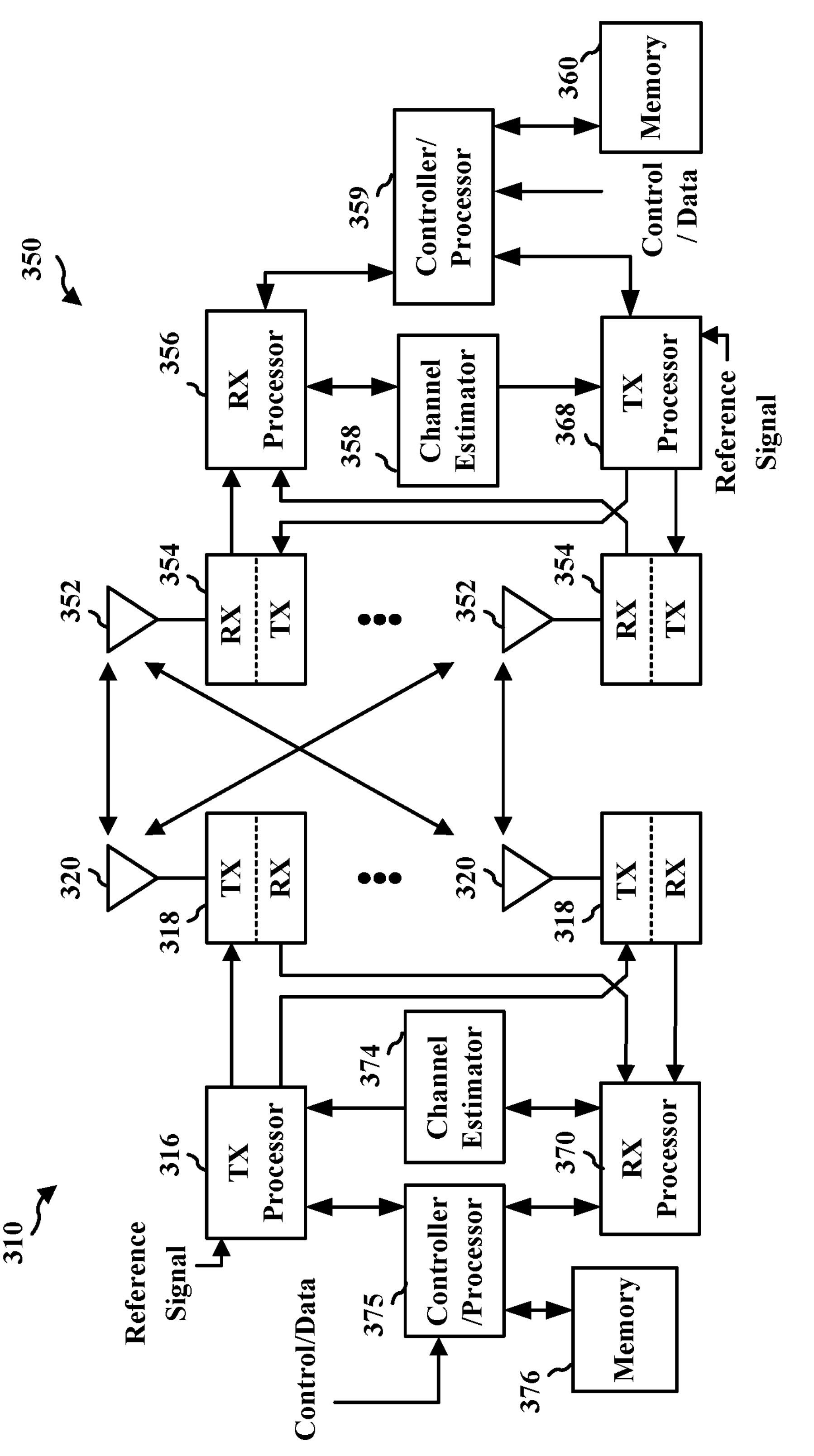
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via a separate transmitter (TX) 354. Each transmitter (TX) 354 may modulate an RF carrier with a respective spatial stream for transmission.

The UL transmission is processed at the base station 310 in a manner similar to that described in connection with the receiver function at the UE 350. Each receiver (RX) 318 receives a signal through its respective antenna 320. Each receiver (RX) 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the rate matching component 198 of FIG. 1.

At least one of the TX processor 316, the RX processor 370, and the controller/processor 375 may be configured to perform aspects in connection with the rate matching component 199 of FIG. 1.

In some wireless communication systems, rate matching may be used by a network entity to rate match one or more incoming bits to available time, subcarrier (frequency), or other available resources. The incoming bits may be encoded and may be transmitted over the available resources based on the rate matching. For example, via rate matching, a network entity may extract a set of bits with a defined number to be transmitted within a TTI. Rate matching may include avoiding the placement of bits in a subset of resources, which may be referred to as rate matching around the subset of resources. By way of example, to perform rate matching, a network entity may perform sub-block interleaving, bit collection, and bit selecting.

PDSCH rate matching may support CORESET-level rate matching in some wireless communication systems. For example, a UE may be configured with one or more higher layer parameters indicating REs declared as not available for PDSCH, such as a parameter indicating rate matching pattern, such as a" "rateMatchPatternToAddModList" parameter provided by a PDSCH configuration parameter (e.g., PDSCH-Config), by a serving cell configuration (e.g., ServingCellConfig or ServingCellConfigCommon) and configuring a number of rate matching patterns (which may be represented by a "RateMatchPattern" parameter), such as up to 4 rate matching patterns per BWP and up to 4 per serving-cell.

A rate match pattern parameter may include, by way of example, within a BWP, when provided by a PDSCH configuration (e.g., PDSCH-Config) or within a serving cell configuration (e.g., when provided by ServingCellConfig or ServingCellConfigCommon), a pair of reserved resources with numerology provided by higher layer parameter subcarrierSpacing given by rate match pattern when configured per serving cell or by numerology of associated BWP when configured per BWP. The pair of reserved resources may be respectively indicated by an RB level bitmap (e.g., represented by a higher layer parameter resourceBlocks provided by RateMatchPattern) with 1 RB granularity and a symbol level bitmap spanning one or two slots (e.g., represented by higher layer parameters symbolsInResourceBlock provided by RateMatchPattern) for which the reserved RBs apply. A bit value equal to 1 in the RB and symbol level bitmaps may indicate that the corresponding resource is not available for PDSCH. For each pair of RB and symbol level bitmaps, a UE may be configured with a time-domain pattern (e.g., represented by a higher layer parameter "periodicityAndPattern" provided by RateMatchPattern). Each bit of the periodicity and pattern parameter may correspond to a unit equal to a duration of the symbol level bitmap, and a bit value equal to 1 may indicate that the pair is present in the unit. The periodicity and pattern parameter may be {1, 2, 4, 5, 8, 10, 20 or 40} units long. The periodicity and pattern parameter may be associated with up to 40 ms time duration. The first symbol of the periodicity and pattern parameter in every 40 ms/P periods may be a first symbol in frame $n_f$ mod 4=0, where P is the duration of periodicity and pattern in units of ms. When the periodicity and pattern parameter is not configured for a pair, for a symbol level bitmap spanning two slots, the bits of the first and second slots may correspond respectively to even and odd slots of a radio frame, and for a symbol level bitmap spanning one slot, the bits of the slot may correspond to every slot of a radio frame. The pair may be included in one or two groups of resource sets (e.g., higher layer parameters rateMatchPatternGroup 1 and rateMatchPatternGroup2). The rateMatchPatternToAddModList provided by a serving cell configuration (such as a ServingCellConfig or ServingCellConfigCommon configuration) in numerology μ may apply to the PDSCH of the same numerology μ without applying to the PDSCH of other numerologies.

A BWP, which may also be referred to as a carrier BWP, Bandwidth Part includes a contiguous set of physical resource blocks (PRBs), selected from a contiguous subset of the common resource blocks for a given numerology on a given frequency carrier.

Figure 4:
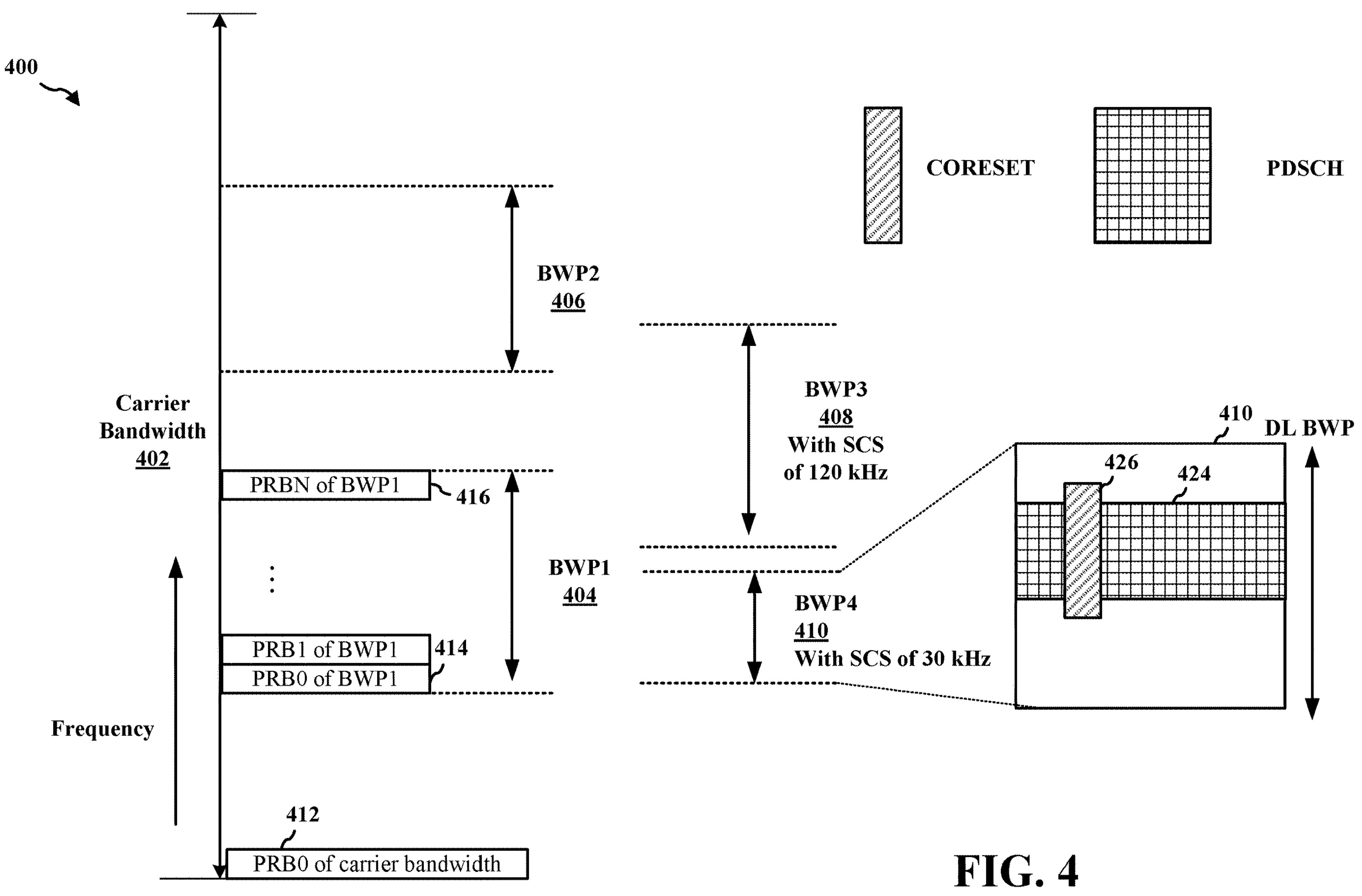
FIG. 4 is a diagram illustrating example CORESET and DL BWP.

FIG. 4 illustrates a frequency diagram 400 showing examples of multiple BWPs. FIG. 4 illustrates carrier bandwidth 402 and multiple BWPs, including BWP1 404, BWP2 406, BWP3 408, and BWP4 410, that correspond to a subset of the carrier bandwidth. The PRBs of the carrier bandwidth 402 may be numbered from a reference PRB, such as the example of PRBO 412, as a common reference point for the BWPs relative to the carrier bandwidth. Each BWP may be based on an offset between the common reference point, for example, PRBO 412 and a reference point of the particular BWP. Each BWP may span a frequency corresponding to one or more PRBs. For example, FIG. 4 illustrates BWP1 404 spanning PRBO 414 to PRBN 416. Different BWPs may be based on different SCSs. For example, BWP3 408 is illustrated in FIG. 4 as having a 120 kHz SCS, and BWP4 is illustrated as having a 30 kHz SCS.

A UE is not expected to receive PDSCH, PDCCH, CSI-RS, or a tracking reference signal (TRS) outside of an active downlink bandwidth part. Each downlink BWP may include at least one CORESET with a UE specific search space. At least one of the BWPs may include a CORESET with a common search space. A UE may not transmit PUSCH or PUCCH outside of an active uplink BWP.

A UE may receive a configuration for multiple BWPs, and one BWP may be active for the UE at a given time. The UE may switch the active BWP between different BWPs configured for the UE. The BWP switch may be triggered in any of various ways, including downlink control signaling activating a BWP, expiration of an inactivity timer, RRC signaling, initiation by a MAC entity, among other possible examples.

A CORESET corresponds to a configurable set of physical resources in time and frequency that a UE uses to monitor for PDCCH/DCI. Each CORESET comprises one or more resource blocks in the frequency domain and one or more symbols in the time domain. The frequency resources of a CORESET may be contiguous or non-contiguous. As an example, a CORESET might comprise multiple RBs in the frequency domain and 1, 2, or 3 contiguous symbols in the time domain. A resource element (RE) is a unit indicating one subcarrier in frequency over a single symbol in time. Parameters for a CORESET may be provided by higher layer parameters, e.g., via an RRC parameter. Among others, such CORESET parameters may indicate a duration parameter indicating a length in time, a frequency domain resource parameter, a parameter indicating whether a CCE-to-REG mapping is interleaved or non-interleaved, and/or a REG bundle size comprising a number of REGs, an aggregation level indicating an amount of CCEs allocated for PDCCH, etc. Each CORESET may be identified using a CORESET ID. A common CORESET that is not UE specific, e.g., being configured via a MIB, may be indicated as CORESET 0. CORESET 0 may correspond to an initial BWP, a default BWP, etc. CORESETs configured in dedicated signaling for the UE may be identified beginning with CORESET 1, CORESET 2, and so forth.

Within a BWP, a frequency domain resource of a CORESET may be configured by associated parameters (e.g., ControlResourceSet with controlResourceSetId or ControlResourceSetZero) and time domain resource may be determined by higher layer parameters such as monitoringSlotPeriodicityAndOffset, duration and monitoring SymbolsWithinSlot of all search-space-sets (e.g., configured by SearchSpace) and time domain resource of search-space-set zero (e.g., configured by searchSpaceZero) associated with the CORESET and CORESET duration (e.g., configured by ControlResourceSet with controlResourceSetId or ControlResourceSetZero). This resource not available for PDSCH may be included in one or two groups of resource sets (e.g., higher layer parameters rateMatchPatternGroup 1 and rateMatchPatternGroup2).

In the example above, if the RB-level rate matching is per-BWP, the rate matching pattern is based on the numerology of the BWP. If the RB-level rate matching is per-serving cell, the rate matching pattern is based on the numerology configured by the subcarrier spacing parameter (if provided). In addition, the RB-level rate matching per-serving cell may apply to PDSCH with the same numerology without applying to PDSCH of other numerologies. However, in the example above where RateMatchPattern including controlResourceSetId is configured, the reference numerology for the CORESET-level rate matching is not clear. For example, if the UE is configured with a CORESET-ID (e.g., a value of controlResourceSetId configured in a RateMatchPattern) for a CORESET with one numerology for CORESET-level rate matching while the active DL BWP for the UE is with another numerology, the reference numerology may not be defined. For example, as illustrated in diagram 400 of FIG. 4, a DL BWP 410 may include a PDSCH 424. A CORESET 426 may also be included. As illustrated in FIG. 4, the PDSCH 424 and the CORESET 426 may be overlapping with each other. The PDSCH 424 may be associated with a 30 kHz SCS and the CORESET 406 may be associated with a 15 kHz SCS. Therefore, the CORESET 406 may be associated with a different numerology compared to the DL BWP 410 and the PDSCH 404.

Figure 5:
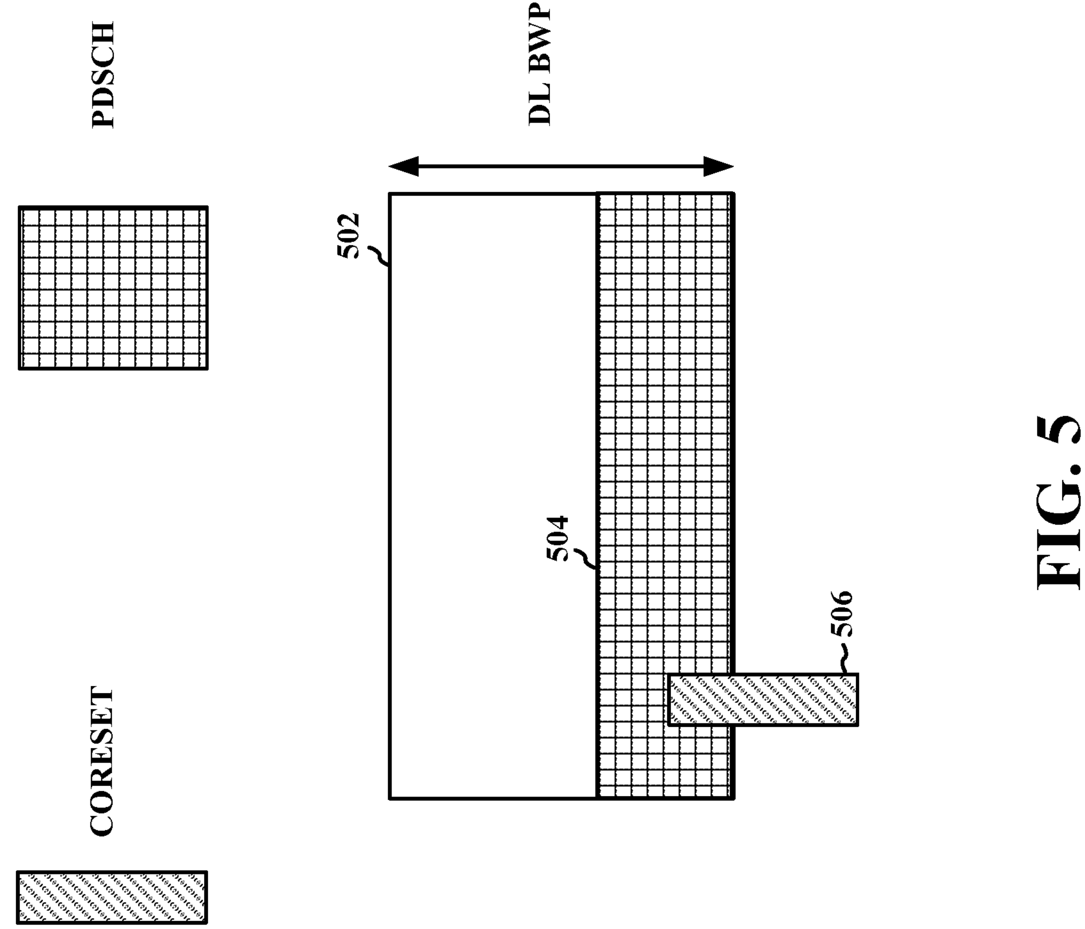
FIG. 5 is a diagram illustrating example CORESET and DL BWP.
Figure 5:
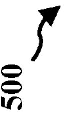

Furthermore, in the example above, whether the CORESET-level rate-matching applies when a CORESET is partially included in the active DL BWP is not clear. For example, as illustrated in example 500 of FIG. 5, a DL BWP 502 may include a PDSCH 504 and a CORESET 506 may be partially overlapping with the CORESET 506 and the PDSCH 504 in the frequency domain. For such a case, whether the CORESET-level rate-matching applies to a PDSCH in the DL BWP may be unclear in the example previously described.

Figure 6:
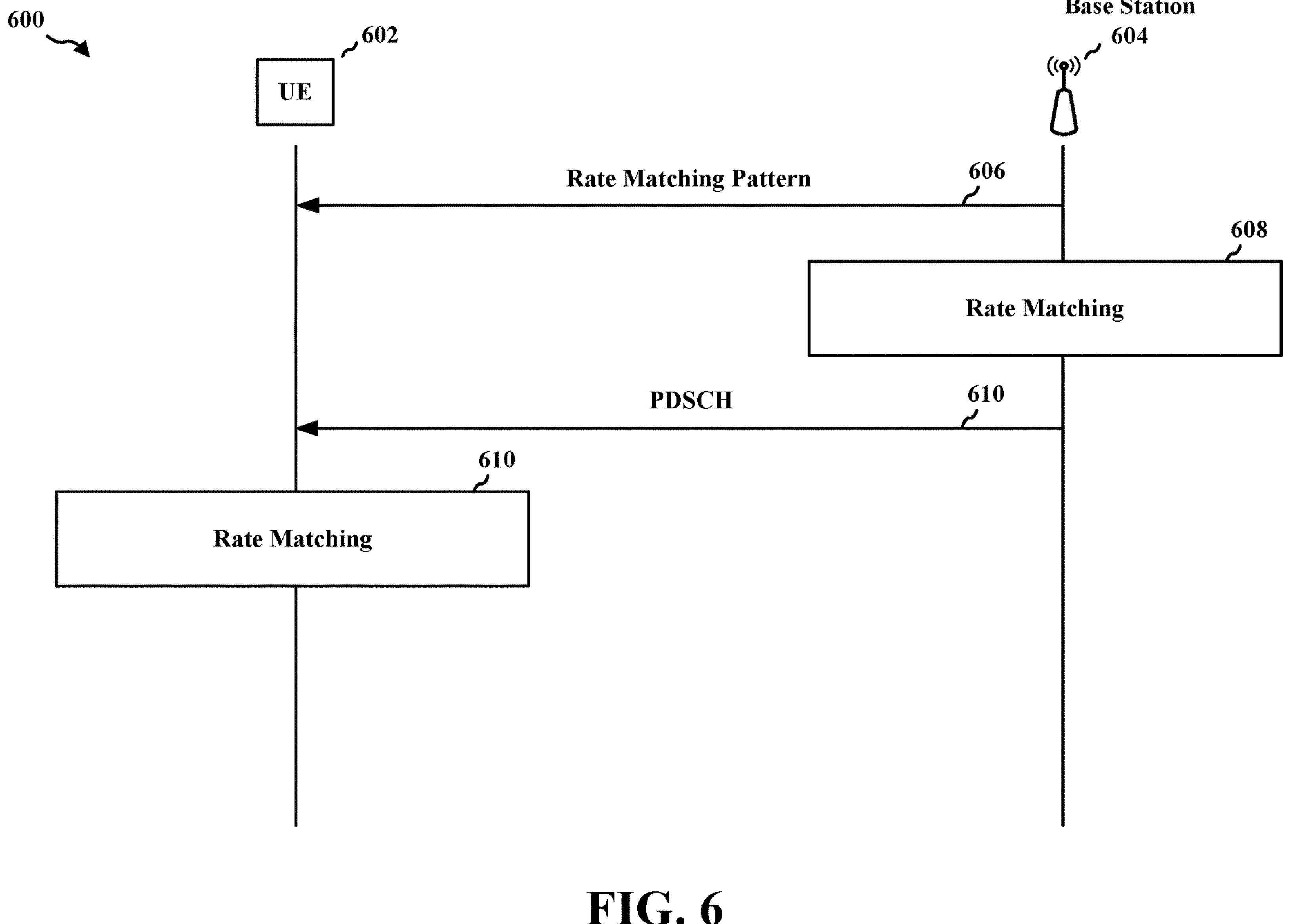
FIG. 6 is a diagram illustrating communication flow between a UE and a base station.

Example aspects provided herein provide reference numerology for CORESET-level rate matching. In some aspects, a UE may be configured with a CORESET-ID in a rate match pattern parameter. For example, as illustrated in example 600 of FIG. 6, the UE 602 may be configured with a rate matching pattern 606, such as a rate match pattern parameter, by the base station 604. In some aspects, the base station 604 may be a network entity. The network entity may be a network node. The base station 604 may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (MC), or a Non-Real Time (Non-RT) RIC. The rate match pattern may be in a PDSCH configuration, such as a PDSCH-Config parameter, or in serving cell configuration such as ServingCellConfigDedicated or ServingCellConfigCommon parameter. In some aspects, all CORESETs across all the DL BWP configurations may have their own individual IDs. Therefore, the CORESET-ID in a rate match pattern may point to one particular (e.g., any) CORESET of one particular (e.g., any) DL BWP configuration. After receiving the rate matching pattern 606, the base station 604 may accordingly rate match the PDSCH around the CORESET at 608, and the UE may perform a corresponding rate matching to receive the PDSCH. The rate matching performed by the UE may also be referred to as de-rate matching, in some aspects.

The UE 602 may rate-match PDSCH according to the CORESET-ID in each rate match pattern. For example, PDSCH in DL BWP #a, a being any integer, may be rate-matched around the CORESET having the CORESET-ID in DL BWP #b, b being any integer. For example, for a current active DL BWP #a for PDSCH reception where the rate matching pattern 606 being either RateMatchPattern #1-CORESET-ID #x (x being an integer) in DL BWP #b (b being an integer) or RateMatchPattern #2-CORESET-ID #y (y being an integer) in DL BWP #c (c being an integer), the UE 602 may rate match PDSCH 610 in DL BWP #a around time and frequency resources identified by 1) the CORESET-ID #x and associated search space sets in DL BWP #b and 2) the CORESET-ID #y and associated search space sets in DL BWP #c. In some aspects, the UE 602 may not be configured with rate matching pattern, such as represented by a RateMatchPattern parameter, indicating a CORESET-ID for a CORESET using different numerology from the numerology for the active DL BWP for PDSCH reception. For example, a network entity, such as the base station 604, may configure RateMatchPattern configurations such that the PDSCH rate-matching with different numerologies do not occur. In some aspects, the UE 602 may be configured with rate matching pattern, such as represented by a RateMatchPattern parameter, indicating a CORESET-ID for a CORESET using different numerology from the numerology for the active DL BWP for PDSCH reception. In such aspects, the UE may not apply rate-matching according to the RateMatchPattern for the PDSCH reception. For example, if the scheduled PDSCH and the RateMatchPattern with a controlResourceSetId have the same numerology, then the UE 602 may receive the PDSCH 610 with the rate-matching. If the scheduled PDSCH and the RateMatchPattern with the controlResourceSetId have different numerologies, then the UE 602 may receive the PDSCH 610 without the rate-matching.

In some aspects, partial overlap between a CORESET and a DL BWP may be allowed. The UE 602 may not monitor PDCCH on search space sets associated with the CORESET that is not fully included in the DL BWP. If the CORESET-ID for the partial overlapping CORESET (partially overlapping with the DL BWP such as the CORESET 506) or a fully included CORESET (such as the CORESET 406) may be pointed in the RateMatchPattern, the UE may apply PDSCH rate-matching around the CORESET. In some aspects, the CORESET-ID in a rate matching pattern, such as the RateMatchPattern for rate-matching a PDSCH in a DL BWP, may be the CORESET-ID for a CORESET configured for the DL BWP for PDSCH reception.

In some aspects, any CORESETs that may be configured to associate with search space sets in the DL BWP for PDSCH reception, except for CORESET-0, may be within the DL BWP for PDSCH reception. CORESET-0 may be exceptional where it may still be configurable to associate with search space sets for the DL BWP for PDSCH reception even if it is not fully included in the DL BWP. In some aspects, the CORESET-ID in a rate matching pattern, such as a RateMatchPattern for rate-matching a PDSCH in a DL BWP, may be the CORESET-ID for a CORESET configured for the DL BWP for PDSCH reception (and the CORESET-ID is not 0). Therefore, the CORESET for PDSCH rate-matching may be the CORESET configured for the DL BWP of PDSCH reception and not CORESET-0. In some aspects, The CORESET-ID in a rate matching pattern, such as a RateMatchPattern for rate-matching a PDSCH in a DL BWP, may be the CORESET-ID for a CORESET configured for the DL BWP for PDSCH reception and the CORESET-ID is not 0 if the CORESET-0 is not fully included in the DL BWP for PDSCH reception. In some aspects, the CORESET for PDSCH rate-matching may be the CORESET configured for the DL BWP of PDSCH reception or CORESET-0 (if CORESET-0 is fully included).

Therefore, in some aspects, within a BWP, a full or partial frequency domain resource of a CORESET with a ID (such as controlResourceSetId) configured by a rate matching pattern (such as the RateMatchPattern) with time domain resource determined by one or more higher layer parameters such as a monitoring slot periodicity and offset parameter (monitoringSlotPeriodicityAndOffset), a duration parameter, and a parameter representing monitoring symbol within one slot (such as monitoringSymbolsWithinSlot) of all search-space-sets configured by a parameter representing search space (such as SearchSpace) and time domain resource of search-space-set zero configured by another parameter (such as searchSpaceZeroI) associated with the CORESET as well as CORESET duration configured by a parameter such as (ControlResourceSet). The RateMatch-Pattern for a CORESET with numerology μ may apply to PDSCH of the same numerology μ without applying to PDSCH of other numerologies.

Figure 7:
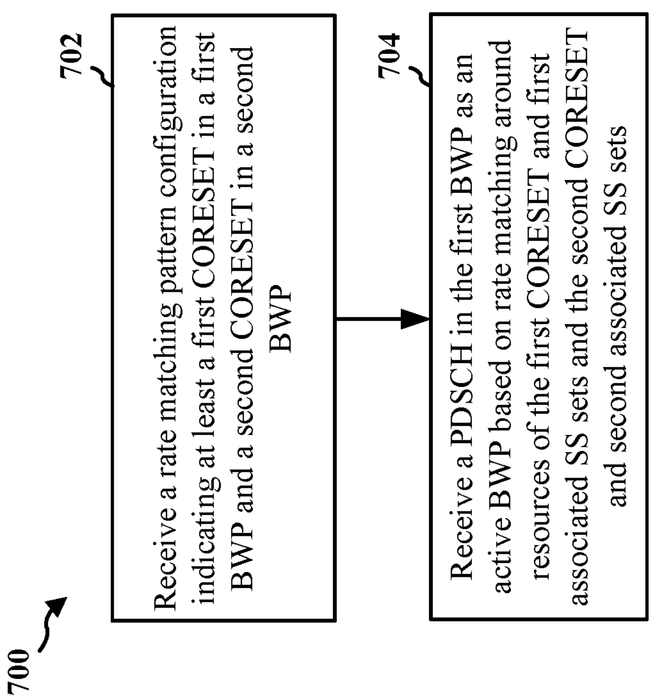
FIG. 7 is a flowchart of a method of wireless communication.

FIG. 7 is a flowchart 700 of a method of wireless communication. The method may be performed by a UE (e.g., the UE 104, the UE 602; the apparatus 1102).

At 702, the UE may receive a rate matching pattern configuration indicating at least a first CORESET in a first BWP and a second CORESET in a second BWP. For example, the UE 602 may receive a rate matching pattern configuration indicating at least a first CORESET in a first BWP and a second CORESET in a second BWP from the base station 604. In some aspects, 702 may be performed by the configuration component 1142 of FIG. 11. In some aspects, each CORESET in the rate matching pattern configuration has a same numerology as the active BWP. In some aspects, the UE receives data mapped to one or more resources of a CORESET in the rate matching pattern configuration having a different numerology than the active BWP. In some aspects, the second CORESET partially overlaps with the first BWP. In some aspects, the rate matching around the resources of the second CORESET is based on the second CORESET being CORESET-0.

At 704, the UE may receive a PDSCH in the first BWP as an active BWP based on rate matching around resources of the first CORESET and first associated SS sets and the second CORESET and second associated SS sets. For example, the UE 602 may receive a PDSCH in the first BWP as an active BWP based on rate matching around resources of the first CORESET and first associated SS sets and the second CORESET and second associated SS sets from the base station 604. In some aspects, 704 may be performed by the PDSCH component 1144 of FIG. 11. In some aspects, the UE receives the PDSCH based on the rate matching around the resources of each CORESET in the rate matching pattern configuration and independent of association with the active BWP. In some aspects, the UE receives the PDSCH based on the rate matching around the resources of each CORESET in the rate matching pattern configuration having a same numerology as the active BWP. In some aspects, the UE does not monitor a PDCCH on the second associated SS set associated with the second CORESET that is outside of the active BWP and receives the PDSCH with rate matching around the second CORESET as if fully included in the active BWP.

Figure 8:
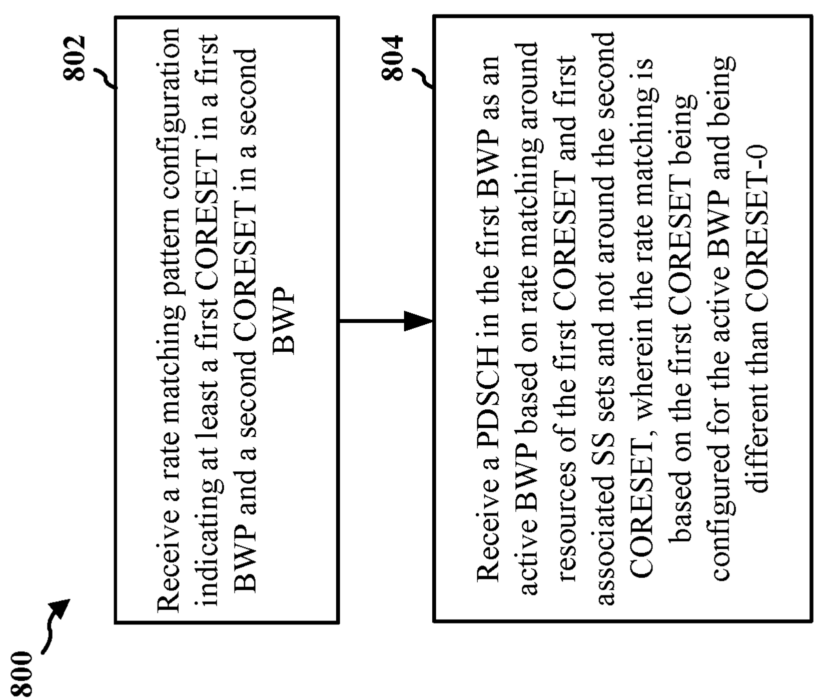
FIG. 8 is a flowchart of a method of wireless communication.

FIG. 8 is a flowchart 800 of a method of wireless communication. The method may be performed by a UE (e.g., the UE 104, the UE 602; the apparatus 1102).

At 802, the UE may receive a rate matching pattern configuration indicating at least a first CORESET in a first BWP and a second CORESET in a second BWP. For example, the UE 602 may receive, from the base station 604, a rate matching pattern configuration indicating at least a first CORESET in a first BWP and a second CORESET in a second BWP from the base station 604. In some aspects, 802 may be performed by the configuration component 1142 of FIG. 11.

At 804, the UE may receive a PDSCH in the first BWP as an active BWP based on rate matching around resources of the first CORESET and first associated SS sets and not around the second CORESET, wherein the rate matching is based on the first CORESET being configured for the active BWP and being different than CORESET-0. For example, the UE 602 may receive, from the base station 604, a PDSCH in the first BWP as an active BWP based on rate matching around resources of the first CORESET and first associated SS sets and not around the second CORESET, wherein the rate matching is based on the first CORESET being configured for the active BWP and being different than CORESET-0. In some aspects, 804 may be performed by the PDSCH component 1144 of FIG. 11. In some aspects, reception of the PDSCH is further based on the rate matching around the CORESET-0 based on the CORESET-0 being fully within the active BWP.

Figure 9:
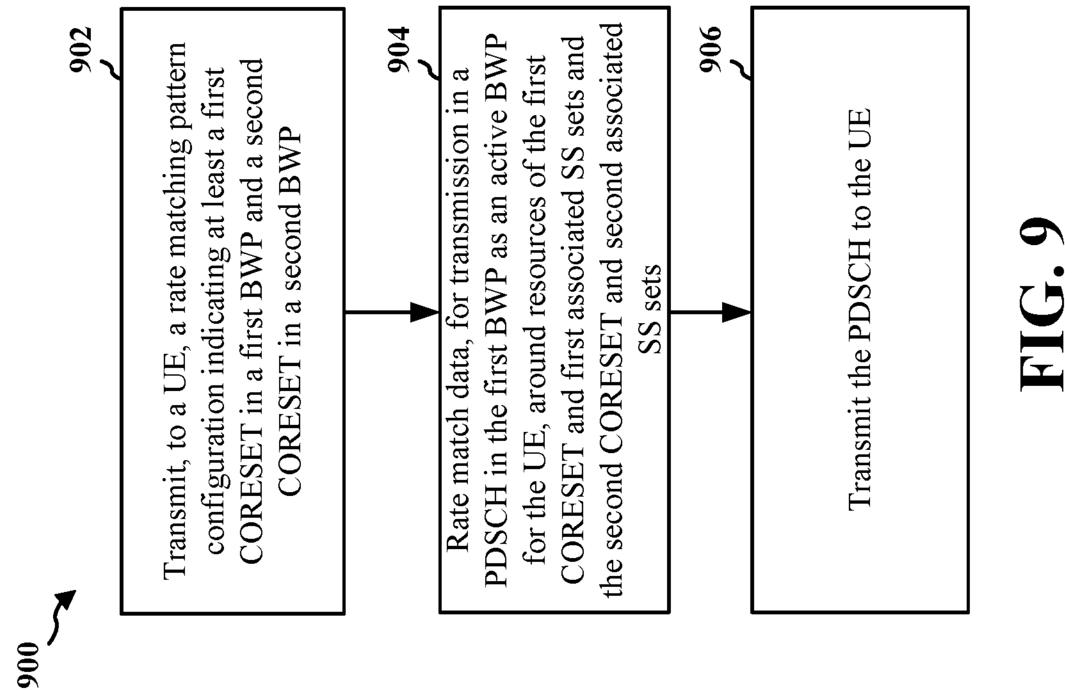
FIG. 9 is a flowchart of a method of wireless communication.

FIG. 9 is a flowchart 900 of a method of wireless communication. The method may be performed by a base station (e.g., the base station 102/180, the base station 604; the apparatus 1202). The base station may be a network entity such as a network node.

At 902, the base station may transmit, to a UE, a rate matching pattern configuration indicating at least a first CORESET in a first BWP and a second CORESET in a second BWP. For example, the base station 604 may transmit, to the UE 602, a rate matching pattern configuration indicating at least a first CORESET in a first BWP and a second CORESET in a second BWP. In some aspects, 902 may be performed by the configuration component 1242 of FIG. 12. In some aspects, each CORESET in the rate matching pattern configuration has a same numerology as the active BWP. In some aspects, the second CORESET partially overlaps with the first BWP.

At 904, the base station may rate match data, for transmission in a PDSCH in the first BWP as an active BWP for the UE, around resources of the first CORESET and first associated SS sets and the second CORESET and second associated SS sets. For example, the base station 604 may rate match data, for transmission in a PDSCH in the first BWP as an active BWP for the UE, around resources of the first CORESET and first associated SS sets and the second CORESET and second associated SS sets. In some aspects, 904 may be performed by the rate matching component 1244 of FIG. 12. In some aspects, the base station rate matches the data for the PDSCH around the resources of each CORESET in the rate matching pattern configuration and independent of association with the active BWP. In some aspects, the base station rate matches the data for the PDSCH around the resources of each CORESET in the rate matching pattern configuration having a same numerology as the active BWP for the UE. In some aspects, the base station maps the data to one or more resources of a CORESET in the rate matching pattern having a different numerology than the active BWP for the UE. In some aspects, the rate matching around the resources of the second CORESET is based on the second CORESET being CORESET-0.

At 906, the base station may transmit the PDSCH to the UE. For example, the base station 604 may transmit the PDSCH to the UE 602. In some aspects, 906 may be performed by the PDSCH component 1246 of FIG. 12. In some aspects, the base station does not transmit a PDCCH to the UE on the second associated SS set associated with the second CORESET that is outside of the active BWP and applies PDSCH rate matching around the second CORESET as if fully included in the active BWP for the UE.

Figure 10:
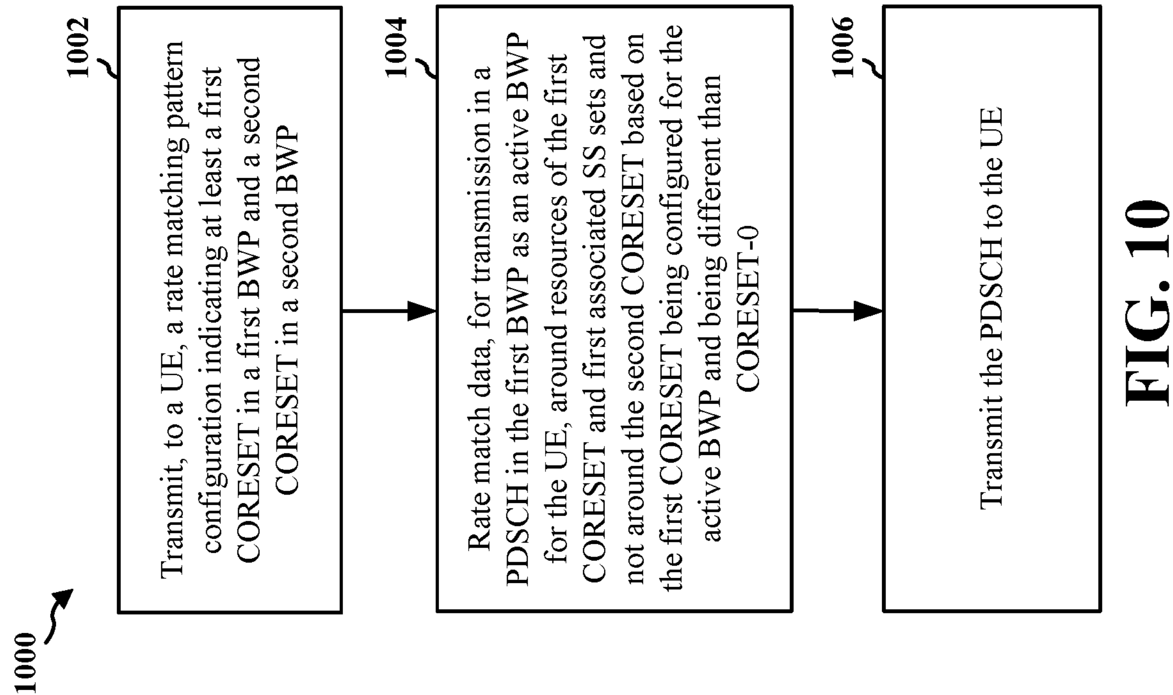
FIG. 10 is a flowchart of a method of wireless communication.

FIG. 10 is a flowchart 1000 of a method of wireless communication. The method may be performed by a base station (e.g., the base station 102/180, the base station 604; the apparatus 1202).

At 1002, the base station may transmit, to a UE, a rate matching pattern configuration indicating at least a first CORESET in a first BWP and a second CORESET in a second BWP. For example, the base station 604 may transmit, to the UE 602, a rate matching pattern configuration indicating at least a first CORESET in a first BWP and a second CORESET in a second BWP. In some aspects, 1002 may be performed by the configuration component 1242 of FIG. 12.

At 1004, the base station may rate match data, for transmission in a PDSCH in the first BWP as an active BWP for the UE, around resources of the first CORESET and first associated SS sets and not around the second CORESET based on the first CORESET being configured for the active BWP and being different than CORESET-0. For example, the base station 604 may rate match data, for transmission in a PDSCH in the first BWP as an active BWP for the UE, around resources of the first CORESET and first associated SS sets and not around the second CORESET based on the first CORESET being configured for the active BWP and being different than CORESET-0. In some aspects, 1004 may be performed by the rate matching component 1244 of FIG. 12. In some aspects, the rate matching is further around the CORESET-0 based on the CORESET-0 being fully within the active BW.

At 1006, the base station may transmit the PDSCH to the UE. For example, the base station 604 may transmit the PDSCH to the UE 602. In some aspects, 1006 may be performed by the PDSCH component 1246 of FIG. 12.

Figure 11:
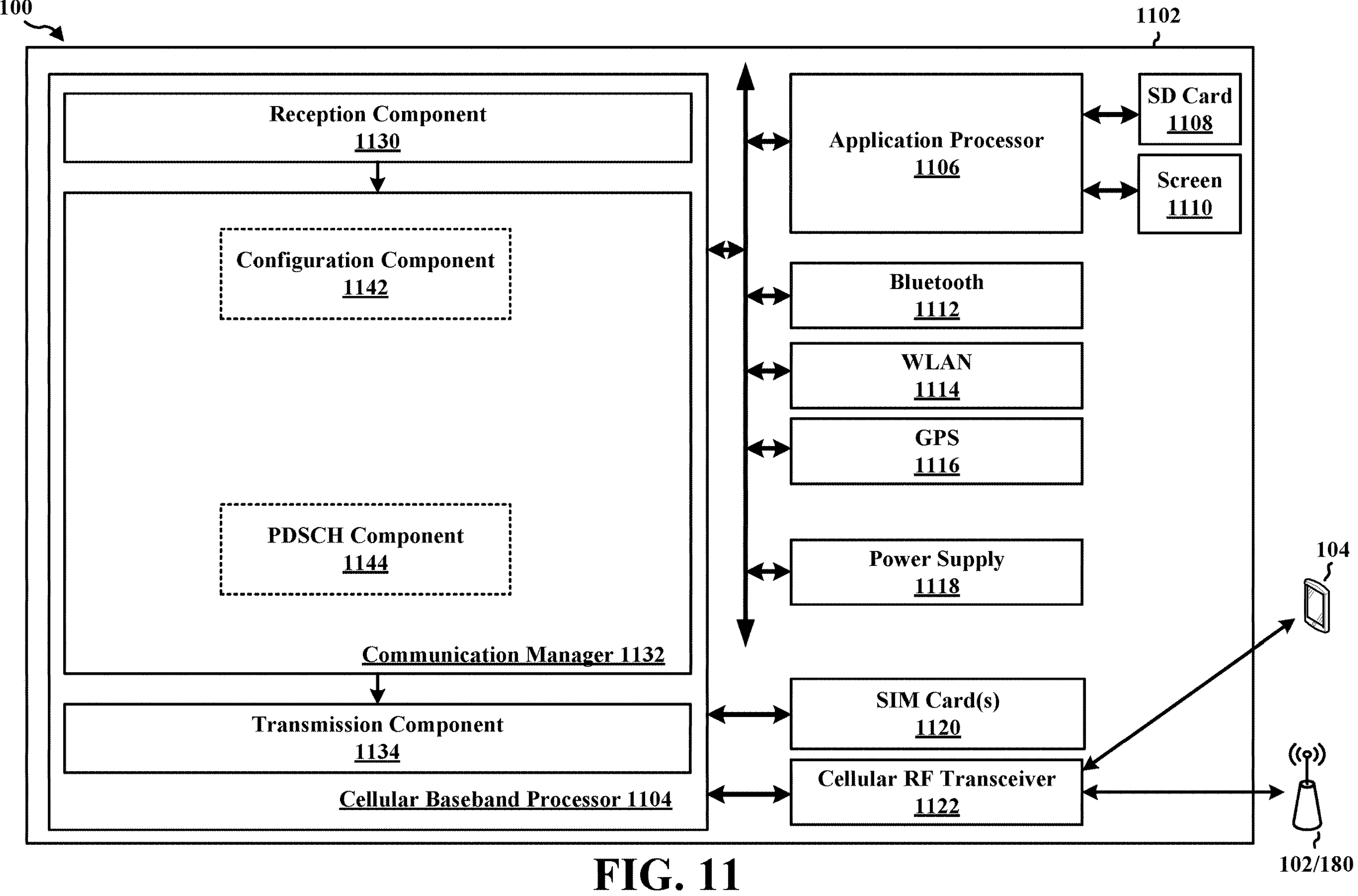
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include a configuration component 1142 that is configured to receive a rate matching pattern configuration indicating at least a first CORESET in a first BWP and a second CORESET in a second BWP, or receive a rate matching pattern configuration indicating at least a first CORESET in a first BWP and a second CORESET in a second BWP, e.g., as described in connection with 702 in FIGS. 7 and 802 in FIG. 8. The communication manager 1132 may further include a PDSCH component 1144 that may be configured to receive a PDSCH in the first BWP as an active BWP based on rate matching around resources of the first CORESET and first associated SS sets and the second CORESET and second associated SS sets, or receive a PDSCH in the first BWP as an active BWP based on rate matching around resources of the first CORESET and first associated SS sets and not around the second CORESET, wherein the rate matching is based on the first CORESET being configured for the active BWP and being different than CORESET-0, e.g., as described in connection with 704 in FIGS. 7 and 804 in FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for receiving a rate matching pattern configuration indicating at least a first CORESET in a first BWP and a second CORESET in a second BWP. The cellular base band processor 1104 may further include means for receiving a PDSCH in the first BWP as an active BWP based on rate matching around resources of the first CORESET and first associated SS sets and the second CORESET and second associated SS sets. The cellular base band processor 1104 may further include means for receiving a rate matching pattern configuration indicating at least a first CORESET in a first BWP and a second CORESET in a second BWP. The cellular base band processor 1104 may further include means for receiving a PDSCH in the first BWP as an active BWP based on rate matching around resources of the first CORESET and first associated SS sets and not around the second CORESET, wherein the rate matching is based on the first CORESET being configured for the active BWP and being different than CORESET-0. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
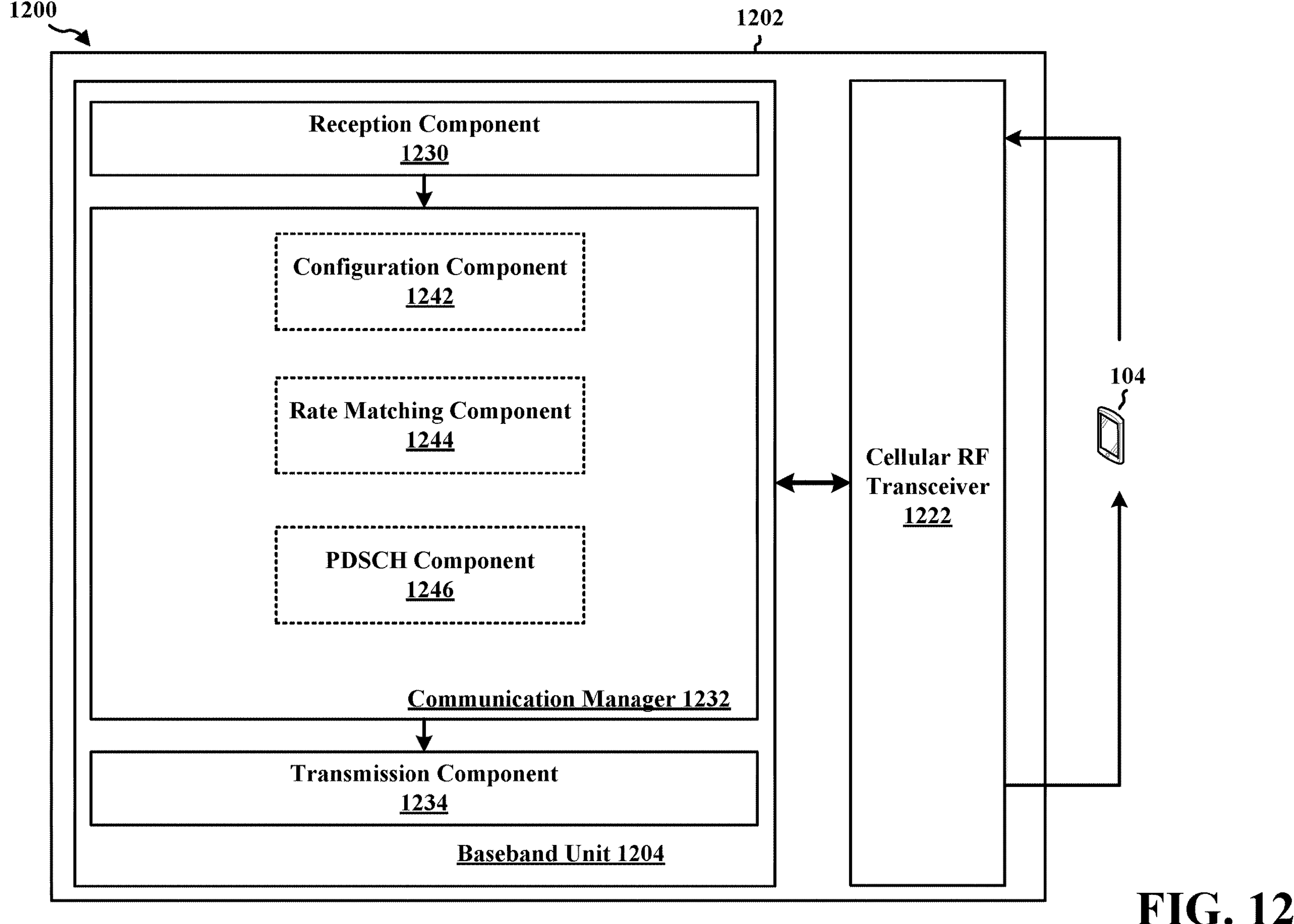
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include a configuration component 1242 that may transmit, to a UE, a rate matching pattern configuration indicating at least a first CORESET in a first BWP and a second CORESET in a second BWP, or transmit, to a UE, a rate matching pattern configuration indicating at least a first CORESET in a first BWP and a second CORESET in a second BWP, e.g., as described in connection with 902 in FIGS. 9 and 1002 in FIG. 9. The communication manager 1232 further may include a rate matching component 1244 that may rate match data, for transmission in a PDSCH in the first BWP as an active BWP for the UE, around resources of the first CORESET and first associated SS sets and the second CORESET and second associated SS sets, or rate match data, for transmission in a PDSCH in the first BWP as an active BWP for the UE, around resources of the first CORESET and first associated SS sets and not around the second CORESET based on the first CORESET being configured for the active BWP and being different than CORESET-0, e.g., as described in connection with 904 in FIGS. 9 and 1004 in FIG. 9. The communication manager 1232 further may include a PDSCH component 1246 that may transmit the PDSCH to the UE, e.g., as described in connection with 906 in FIGS. 9 and 1006 in FIG. 9.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, may include means for transmitting, to a UE, a rate matching pattern configuration indicating at least a first CORESET in a first BWP and a second CORESET in a second BWP. The baseband unit 1204 may further include means for rate matching data, for transmission in a PDSCH in the first BWP as an active BWP for the UE, around resources of the first CORESET and first associated SS sets and the second CORESET and second associated SS sets. The baseband unit 1204 may further include means for transmitting the PDSCH to the UE. The baseband unit 1204 may further include means for transmitting, to a UE, a rate matching pattern configuration indicating at least a first CORESET in a first BWP and a second CORESET in a second BWP. The baseband unit 1204 may further include means for rate matching data, for transmission in a PDSCH in the first BWP as an active BWP for the UE, around resources of the first CORESET and first associated SS sets and not around the second CORESET based on the first CORESET being configured for the active BWP and being different than CORESET-0. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication, including: a memory; and at least one processor coupled to the memory, where the at least one processor is configured to: receive a rate matching pattern configuration indicating at least a first control resource set (CORESET) in a first bandwidth part (BWP) and a second CORESET in a second BWP; receive a physical downlink shared channel (PDSCH) transmission in the first BWP as an active BWP; and process the PDSCH transmission based on the rate matching pattern configuration, where to process the PDSCH transmission based on the rate matching pattern configuration, the at least one processor is configured to rate match around resources of the first CORESET and first associated search space (SS) sets and the second CORESET and second associated SS sets.

Aspect 2 is the apparatus of aspect 1, where the rate matching pattern configuration is associated with a set of CORESETs including the first CORESET and the second CORESET, and where to process the PDSCH transmission based on the rate matching pattern configuration, the at least one processor is configured to: rate match around resources of each CORESET in the set of CORESETs independent of whether the set of CORESETs is associated with the active BWP.

Aspect 3 is the apparatus of any of aspects 1-2, where each CORESET in the set of CORESETs has a same numerology as the active BWP.

Aspect 4 is the apparatus of any of aspects 1-3, where the rate matching pattern configuration is associated with a set of CORESETs including the first CORESET and the second CORESET, and where to process the PDSCH transmission based on the rate matching pattern configuration, the at least one processor is configured to: rate match around resources associated with a first subset of CORESETs of the set of CORESETs and not rate match around resources associated with a second subset of CORESETs of the set of CORESETs, the first subset of CORESETs being associated with a same numerology as the active BWP, the second subset of CORESETs being associated with a different numerology as the active BWP.

Aspect 5 is the apparatus of any of aspects 1-4, where the at least one processor is configured to: receive data mapped to one or more resources of a third CORESET in the rate matching pattern configuration, the one or more resources having the different numerology than the active BWP.

Aspect 6 is the apparatus of any of aspects 1-5, where the second CORESET partially overlaps with the first BWP.

Aspect 7 is the apparatus of any of aspects 1-6, where the at least one processor is configured to: refrain from monitoring a physical downlink control channel (PDCCH) transmission on the second associated SS set associated with the second CORESET that is outside of the active BWP and receive a portion of the PDSCH transmission associated with the rate match around the second CORESET as if the portion is fully included in the active BWP.

Aspect 8 is the apparatus of any of aspects 1-7, where the rate matching around the resources of the second CORESET is based on the second CORESET being CORESET-0 associated with a physical downlink control channel (PDCCH) for system information block (SIB).

Aspect 9 is the apparatus of any of aspects 1-8, where the rate matching pattern configuration represents excluded resources of the first CORESET or the second CORESET.

Aspect 10 is an apparatus for wireless communication, including: a memory; and at least one processor coupled to the memory, where the at least one processor is configured to: receive a rate matching pattern configuration indicating at least a first control resource set (CORESET) in a first bandwidth part (BWP) and a second CORESET in a second BWP; receive a physical downlink shared channel (PDSCH) transmission in the first BWP as an active BWP; and process the PDSCH transmission based on the rate matching pattern configuration, where to process the PDSCH transmission based on the rate matching pattern configuration, the at least one processor is configured to rate match around resources of the first CORESET and first associated search space (SS) sets and not around the second CORESET, where the rate matching is based on the first CORESET being configured for the active BWP and being different than CORESET-0.

Aspect 11 is the apparatus of aspect 10, where to process the PDSCH transmission based on the rate matching pattern configuration, the at least one processor is configured to rate match around the CORESET-0 based on the CORESET-0 being fully within the active BWP.

Aspect 12 is the apparatus of any of aspects 10-11, where the CORESET-0 is associated with a physical downlink control channel (PDCCH) for system information block (SIB).

Aspect 13 is the apparatus of any of aspects 10-12, where the rate matching pattern configuration represents excluded resources of the first CORESET or the second CORESET.

Aspect 14 is a network entity for wireless communication, including: a memory; and at least one processor coupled to the memory, where the at least one processor is configured to: transmit, for a user equipment (UE), a rate matching pattern configuration indicating at least a first control resource set (CORESET) in a first bandwidth part (BWP) and a second CORESET in a second BWP; rate match data, for a physical downlink shared channel (PDSCH) transmission in the first BWP as an active BWP for the UE, around resources of the first CORESET and first associated search space (SS) sets and the second CORESET and second associated SS sets; and transmit the PDSCH transmission for the UE.

Aspect 15 is the network entity of aspect 14, where the rate matching pattern configuration is associated with a set of CORESETs including the first CORESET and the second CORESET, and where the at least one processor is configured to rate match the data for the PDSCH transmission around resources of the set of CORESETs independent of whether the set of CORESETs is associated with the active BWP.

Aspect 16 is the network entity of any of aspects 14-15, where each CORESET in the set of CORESETs has a same numerology as the active BWP.

Aspect 17 is the network entity of any of aspects 14-16, where the rate matching pattern configuration is associated with a set of CORESETs including the first CORESET and the second CORESET, and where the at least one processor is configured to: rate match around resources associated with a first subset of CORESETs of the set of CORESETs and not rate match around resources associated with a second subset of CORESETs of the set of CORESETs, the first subset of CORESETs being associated with a same numerology as the active BWP, the second subset of CORESETs being associated with a different numerology as the active BWP.

Aspect 18 is the network entity of any of aspects 14-17, where the at least one processor is configured to map the data to one or more resources of a third CORESET in the rate matching pattern, the one or more resources having the different numerology than the active BWP for the UE.

Aspect 19 is the network entity of any of aspects 14-18, where the second CORESET partially overlaps with the first BWP.

Aspect 20 is the network entity of any of aspects 14-19, where the at least one processor is configured to refrain from transmitting a physical downlink control channel (PDCCH) transmission for the UE on the second associated SS set associated with the second CORESET that is outside of the active BWP; and apply PDSCH rate matching around the second CORESET as if fully included in the active BWP for the UE.

Aspect 21 is the network entity of any of aspects 14-20, where to rate match the data for the PDSCH transmission, the at least one processor is further configured to: rate match around the resources of the second CORESET based on the second CORESET being CORESET-0, and where the CORESET-0 is associated with a physical downlink control channel (PDCCH) for system information block (SIB).

Aspect 22 is the network entity of any of aspects 14-21, where the rate matching pattern configuration represents excluded resources of the first CORESET or the second CORESET, and where the network entity corresponds to a base station.

Aspect 23 is a network entity for wireless communication, including: a memory; and at least one processor coupled to the memory, where the at least one processor is configured to: transmit, to a user equipment (UE), a rate matching pattern configuration indicating at least a first control resource set (CORESET) in a first bandwidth part (BWP) and a second CORESET in a second BWP; rate match data, for a physical downlink shared channel (PDSCH) transmission in the first BWP as an active BWP for the UE, around resources of the first CORESET and first associated search space (SS) sets and not around the second CORESET based on the first CORESET being configured for the active BWP and being different than CORESET-0; and transmit the PDSCH transmission to the UE.

Aspect 24 is the network entity of aspect 23, where to rate match the data for the PDSCH transmission, the at least one processor is further configured to: rate match around the CORESET-0 based on the CORESET-0 being fully within the active BWP.

Aspect 25 is the network entity of any of aspects 23-24, where the CORESET-0 is associated with a physical downlink control channel (PDCCH) for system information block (SIB).

Aspect 26 is the network entity of any of aspects 23-25, where the rate matching pattern configuration represents excluded resources of the first CORESET or the second CORESET, and where the network entity corresponds to a base station.

Aspect 27 is a method of wireless communication at a network entity for implementing any of aspects 1 to 9.

Aspect 28 is a method of wireless communication at a network entity for implementing any of aspects 10 to 13.

Aspect 29 is a method of wireless communication at a network entity for implementing any of aspects 14 to 22.

Aspect 30 is a method of wireless communication at a network entity for implementing any of aspects 23 to 26.

Aspect 31 is an apparatus including means for implementing any of aspects 1 to 9.

Aspect 32 is an apparatus including means for implementing any of aspects 10 to 13.

Aspect 33 is an apparatus including means for implementing any of aspects 14 to 22.

Aspect 34 is an apparatus including means for implementing any of aspects 23 to 26.

Aspect 35 is a non-transitory computer-readable medium storing computer executable code, where the code when executed by a processor causes the processor to implement any of aspects 1 to 9.

Aspect 36 is a non-transitory computer-readable medium storing computer executable code, where the code when executed by a processor causes the processor to implement any of aspects 10 to 13.

Aspect 37 is a non-transitory computer-readable medium storing computer executable code, where the code when executed by a processor causes the processor to implement any of aspects 14 to 22.

Aspect 38 is a non-transitory computer-readable medium storing computer executable code, where the code when executed by a processor causes the processor to implement any of aspects 23 to 26.

What is claimed is:

1. An apparatus for wireless communication, comprising:

a memory; and at least one processor coupled to the memory, wherein the at least one processor is configured to:

receive a rate matching pattern configuration indicating at least a first control resource set (CORESET) in a first bandwidth part (BWP) and a second CORESET in a second BWP;

receive a physical downlink shared channel (PDSCH) transmission in the first BWP as an active BWP; and process the PDSCH transmission based on the rate matching pattern configuration, wherein to process the PDSCH transmission based on the rate matching pattern configuration, the at least one processor is configured to rate match around resources of the first CORESET and first associated search space (SS) sets and the second CORESET and second associated SS sets, wherein the rate matching pattern configuration is associated with a set of CORESETs including the first CORESET and the second CORESET, and wherein to process the PDSCH transmission based on the rate matching pattern configuration, the at least one processor is configured to:

rate match around resources of each CORESET in the set of CORESETs independent of whether the set of CORESETs is associated with the active BWP, wherein each CORESET in the set of CORESETs has a same numerology as the active BW.

2. An apparatus for wireless communication, comprising:
a memory; and
at least one processor coupled to the memory, wherein the at least one processor is configured to:
receive a rate matching pattern configuration indicating at least a first control resource set (CORESET) in a first bandwidth part (BWP) and a second CORESET in a second BWP;
receive a physical downlink shared channel (PDSCH) transmission in the first BWP as an active BWP; and
process the PDSCH transmission based on the rate matching pattern configuration, wherein to process the PDSCH transmission based on the rate matching pattern configuration, the at least one processor is configured to rate match around resources of the first CORESET and first associated search space (SS) sets and the second CORESET and second associated SS sets, wherein the rate matching pattern configuration is associated with a set of CORESETs including the first CORESET and the second CORESET, and wherein to process the PDSCH transmission based on the rate matching pattern configuration, the at least one processor is configured to:
rate match around resources associated with a first subset of CORESETs of the set of CORESETs and not rate match around resources associated with a second subset of CORESETs of the set of CORESETs, wherein the first subset of CORESETs is associated with a same numerology as the active BWP, and wherein the second subset of CORESETs is associated with a different numerology as the active BWP.

3. The apparatus of claim 2, wherein the at least one processor is configured to:
receive data mapped to one or more resources of a third CORESET in the rate matching pattern configuration, wherein the one or more resources have the different numerology than the active BWP.

4. The apparatus of claim 1, wherein the second CORESET partially overlaps with the first BWP.

5. An apparatus for wireless communication, comprising:
a memory; and
at least one processor coupled to the memory, wherein the at least one processor is configured to:
receive a rate matching pattern configuration indicating at least a first control resource set (CORESET) in a first bandwidth part (BWP) and a second CORESET in a second BWP, wherein the second CORESET partially overlaps with the first BWP;
receive a physical downlink shared channel (PDSCH) transmission in the first BWP as an active BWP;
process the PDSCH transmission based on the rate matching pattern configuration, wherein to process the PDSCH transmission based on the rate matching pattern configuration, the at least one processor is configured to rate match around resources of the first CORESET and first associated search space (SS) sets and the second CORESET and second associated SS sets; and
refrain from monitoring a physical downlink control channel (PDCCH) transmission on the second associated SS set associated with the second CORESET that is outside of the active BWP and receive a portion of the PDSCH transmission associated with the rate match around the second CORESET as if the portion is fully included in the active BWP.

6. An apparatus for wireless communication, comprising:
a memory; and
at least one processor coupled to the memory, wherein the at least one processor is configured to:
receive a rate matching pattern configuration indicating at least a first control resource set (CORESET) in a first bandwidth part (BWP) and a second CORESET in a second BWP, wherein the second CORESET partially overlaps with the first BWP;
receive a physical downlink shared channel (PDSCH) transmission in the first BWP as an active BWP; and
process the PDSCH transmission based on the rate matching pattern configuration, wherein to process the PDSCH transmission based on the rate matching pattern configuration, the at least one processor is configured to rate match around resources of the first CORESET and first associated search space (SS) sets and the second CORESET and second associated SS sets based on the second CORESET being CORESET-0 associated with a physical downlink control channel (PDCCH) for system information block (SIB).

7. The apparatus of claim 1, wherein the rate matching pattern configuration represents excluded resources of the first CORESET or the second CORESET.

8. An apparatus for wireless communication, comprising:
a memory; and
at least one processor coupled to the memory, wherein the at least one processor is configured to:
receive a rate matching pattern configuration indicating at least a first control resource set (CORESET) in a first bandwidth part (BWP) and a second CORESET in a second BWP;
receive a physical downlink shared channel (PDSCH) transmission in the first BWP as an active BWP; and
process the PDSCH transmission based on the rate matching pattern configuration, wherein to process the PDSCH transmission based on the rate matching pattern configuration, the at least one processor is configured to rate match around resources of the first CORESET and first associated search space (SS) sets and not around the second CORESET, wherein the rate matching is based on the first CORESET being configured for the active BWP and being different than CORESET-0, wherein to process the PDSCH transmission based on the rate matching pattern configuration, the at least one processor is configured to rate match around the CORESET-0 based on the CORESET-0 being fully within the active BWP.

9. The apparatus of claim 8, wherein the CORESET-0 is associated with a physical downlink control channel (PDCCH) for system information block (SIB).

10. The apparatus of claim 8, wherein the rate matching pattern configuration represents excluded resources of the first CORESET or the second CORESET.

* * * * *